J. H. BARLEY.
HARROW.
No. 10,913. Reissued Mar. 27, 1888.
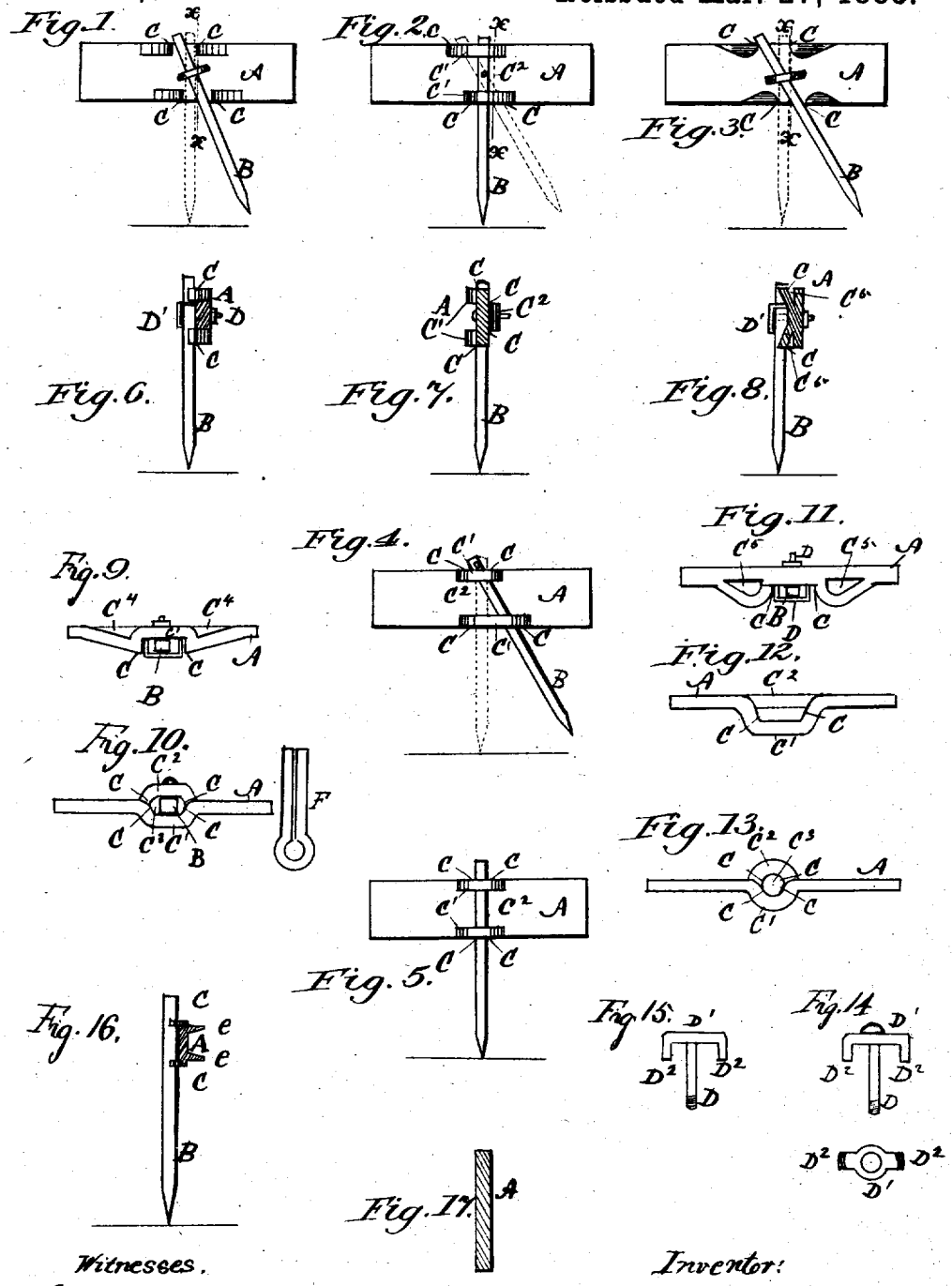
Witnesses.
George Ferrell.
James M. Byler.
Inventor:
James H. Barley.
N. PETERS, Photo-Lithographer, Washington, D. C.

UNITED STATES PATENT OFFICE.

JAMES H. BARLEY, OF SEDALIA, MISSOURI.

HARROW.

SPECIFICATION forming part of Reissued Letters Patent No. 10,913, dated March 27, 1888.

Original No. 326,704, dated September 22, 1885. Application for reissue filed September 12, 1887. Serial No. 249,501.

*To all whom it may concern:*

Be it known that I, JAMES H. BARLEY, a citizen of the United States of America, residing at Sedalia, in the county of Pettis and State of Missouri, have invented certain new and useful Improvements in Harrows, of which the following is a specification.

My invention relates to certain improvements in harrows; and it consists, first, in a metal tooth bar or rail for harrow-tooth frames, having means formed integral therewith for supporting the teeth thereto by rolling, punching, stamping, pressing, bending, or otherwise forming coherent stops thereon or within the body of said bar or rail, by which means the teeth are supported at any desired angle; second, in combination with a harrow tooth and rail, a pivotal bolt which passes through perforations formed through both tooth and rail, the outer or head portion of said bolt provided with an elevated or arch portion, each one of the arms thereof extending out in opposite directions, or at right angle with said bolt, with the outer ends of said arms bent or formed projecting inwardly down to the side of the bar or rail on opposite sides of the tooth, forming an elevated or T-shaped arch over the side of said tooth. Said pivotal bolt is provided with a key or a thread and tightening-nut on its point end, by which the bolt is screwed up tight, securely holding the tooth in place, and yet allowing it to freely move or turn on its pivot.

The object of my invention is to produce a cheaper and more durable tooth-rail for harrows by providing means formed integral thereon for supporting the harrow-teeth directly to metal rails without the intervention of holding-blocks of any kind.

A further and leading object of this invention is to so form and adapt the integral tooth-supports on metal harrow-rails with the teeth pivotally attached between said supports, having space between them longitudinally with said rails, allowing the teeth a horizontal movement in adjusting themselves to stand in a vertical position when the harrow is drawn in one direction and at an inclined position when the motion of the harrow is reversed to the opposite direction.

Another object is to produce a harrow-tooth rail made from bars of ordinary plate metal having integral tooth-supporting shoulders or stops formed thereon, whereby the necessity of providing flanged or other special-shaped metal bars for the construction of said tooth-rails may be dispensed with, thereby greatly reducing the cost of their production.

A further object is to provide a suitable pivotal bolt as constructed and as adapted to hold the teeth to the side of the rails, and allow them to turn freely on their pivots without any liability of the nuts or fastenings of said pivotal bolt becoming loosened.

All the above-named objects I attain by the mechanism illustrated in the accompanying drawings, making part of this specification, and to the letters and figures of reference marked thereon, as hereinafter more fully described, and pointed out in the claims.

In the drawings, Figure 1 represents a side elevation or face view of a portion of one of my improved metal harrow-tooth bars or rails, showing a tooth attached in place and supported at different angles; and Figs. 2, 3, 4, and 5 are similar views of same, showing slight variations in forming the tooth seats and supports and the manner of holding the teeth in their respective places. Figs. 6, 7, and 8 are views of the rail in vertical cross-section taken through the lines *x x*, Figs. 1, 2, and 3. Fig. 9 is a longitudinal edge view of a portion of the rail, showing means formed integral thereon for supporting the tooth; and Figs. 10, 11, 12, and 13 are similar edge views, also showing slight variation in forming the tooth seats and supports. Figs. 14 and 15 are side views of the pivotal bolt; and Fig. 16 is a vertical cross-section of a harrow-tooth rail as made lighter, and supported or strengthened by ribs on its back side, forming an angle or channel shaped rail, as shown. Fig. 17 is a vertical cross-section of a bar of ordinary plate metal before the tooth-supports are formed thereon.

In the drawings, A represents the harrow-tooth bar or rail of which the sections are formed.

B are the teeth, and C are the solidified shoulders or stops for supporting the teeth thereon, which supports are formed integral with said rails, made, preferably, from ordinary bars of plate metal by rolling, punching, stamping, pressing, bending, or otherwise forming said shoulders or stops thereon or within the body of said rail, as before mentioned.

In drawings Figs. 1, 6, and 9, four separate tooth-supports, C, are bent or raised from the sides of the edge portions of the rail A by the use of dies or other suitable means adapted to the purpose, leaving corresponding depressions or cavities, $C^4$ $C^4$, in the opposite side surface of said rail. The metal bars from which said rails are preferably made being first prepared by heat, said tooth-supporting shoulders or stops are formed to project on the side of said rail, and are so arranged thereon as to support the teeth either in a vertical or inclined position, as shown in solid and dotted lines. These shoulders or stops C may be varied somewhat in the manner in which they may be formed or raised upon the tooth-rails A. The metal C′ on the edges of the rail, intervening between the depressions or cavities $C^4$ $C^4$, formed by raising the stops C C therefrom, as shown at Fig. 9, may also be raised with said stops C C and made to project from the side of the rail A a sufficient distance to admit the tooth being passed loosely between the body of said rail and the outer bent or raised portion, forming loop bars or bridges C′, as shown in drawings, Fig. 12, or, in order to avoid any liability of breakage by bending these raised portions or loop-bars C′ far enough from one side of the rail to receive the tooth therein, the remaining central portion, $C^2$, of said rail, intervening between the two raised portions or loop-bars C′ C′, is also bent out from the opposite side thereof, forming a vertical opening, $C^3$, between the loop-bars C′ C′ and the central portion, $C^2$, of said rail A, to receive the harrow-teeth, which are supported therein by the integral shoulders or stops C, formed at suitable distances apart longitudinally with said rail to give the teeth the desired angle at which they are to stand, as shown in drawings, Figs. 2, 4, 5, 7, 10, 12, and 13; or, if preferred, the metal at each tooth-seat may all be bent out on one side of the rail obliquely across the side surface thereof in a similar manner to the bent-out central portion, $C^2$, (shown at drawings, Figs. 2 and 10,) or similar to what is shown in the extreme bent-out portion C′ of said rail, as shown at drawings, Figs. 9, 10, and 12, thus forming depressed tooth-seats having integral tooth-supporting shoulders or stops C at the requisite distances apart longitudinally with said rail to give the harrow-teeth the same pivotal movement, as shown in solid and dotted lines, drawings Figs. 1, 2, 3, and 4.

I do not confine myself to forming the tooth-supporting shoulders or stops C C at equal distances apart upon the rails A, as shown at Figs. 1, 2, and 3, as it will be observed in drawings Fig. 4 the stops C C on the upper edge of the rail may be formed just far enough apart to receive the tooth therein and allow a slight movement, while the stops C C at the lower edge thereof are formed apart a distance proportionate to the angle at which the tooth is to be inclined, in which instance the heads of the teeth are shouldered and suitably perforated to receive a key at the top of the rail to retain the teeth therein and allow them to automatically change their position.

Figs. 5 and 13 show the tooth-seat openings $c^3$ formed in the rail A, as above described, the size of the teeth to be used which are inserted through said openings sufficiently tight as to require no other fastenings to hold them rigidly therein, at whatever angle the teeth are intended to stand.

Figs. 3, 8, and 11 show another slight variation in the manner in which the tooth supports or stops C may be formed on the rail A. In this instance the rails are made somewhat thicker, and a suitable tool or die is prepared and adapted to the purpose. The rails being first prepared by heat, said tool or die is then made to penetrate the edges thereof, by which operation the metal is raised on the side of the rail forming the shoulders or stops C which support the teeth, leaving the cavities $C^5$ in the edges of the rail; or the stops C, as shown, may also be formed integral therewith by making said rails of malleable iron or cast-steel.

In order to attach the teeth to the side of the rails, as shown at Figs. 1 and 3, in such a manner that the teeth will have a free horizontal movement in adjusting themselves to stand at different angles, and are firmly held in their places without any liability of their becoming loosened, a suitably-constructed pivot-bolt may be used.

At Figs. 14 and 15, D is a pivotal bolt, which is provided with an elevated arch portion, D′, which projects out at right angle on either side of said bolt, with the two ends $D^2$ $D^2$ bent or formed to point downwardly in line with the bolt D, said bolt being provided with a key or a thread and tightening nut on its end, the teeth and rail being provided with perforations, through which the bolt D is passed with the ends of the two arms $D^2$ $D^2$ extending down to the rail A at opposite sides of the teeth. Said arms $D^2$ $D^2$ are spaced apart and made of such a length that when the bolt D is screwed tight to the rail the teeth will be held in place and left free to turn on the pivot-bolt D between the rail and the arch portion D′, and are supported in position by the stops C, before mentioned. This arch portion D′ may be made separate and provided with a hole through its middle portion, through which the bolt D is passed; or said arch portion D′ may be united with the bolt D in one piece, as shown at Fig. 15.

At Fig. 10, F is a convenient and cheap pivot-pin, commonly known as a "split cotter," which is provided with a head, the stem being either split apart or formed of two pieces of metal. Said cotter is passed through the tooth and rail. The point ends are then opened or spread apart, securely retaining the tooth in place, avoiding any liability of them becoming loosened, as is the case where a plain bolt and nut are employed.

Fig. 16 shows how, if desired, the rails A may be made lighter by forming two ribs, *e e*, on their rear sides between the tooth-supports, to give them the requisite strength.

I do not confine myself to either one of the variations in producing or forming the tooth supports or stops C, as shown in detail, and above described, as there are still other ways or variations in the manner in which said stops C may be formed thereon or within the body of metal harrow-tooth rails, which I deem unnecessary to further illustrate or describe in detail.

My improved tooth bar or rail A is preferably formed of one continuous bar of wrought plate metal, having integral tooth-supports formed thereon at suitable distances apart for attaching the requisite number of teeth in their respective seats on said rails of which the harrow-sections are formed.

Having thus fully described my invention, what I claim as new and useful, and desire to secure by Letters Patent, is—

1. In a harrow, the metal tooth bars or rails forming the sections thereof having depressions bent in their side surface, whereby integral tooth-supporting shoulders or stops are formed having space between them longitudinally with said bars or rails, and adapted to limit the horizontal movement of the self-adjusting tooth to stand either in a vertical or inclined position with respect to the direction in which the harrow is drawn, substantially as described.

2. A wrought-metal harrow-tooth bar or rail having a series of depressed open-sided tooth-seats formed in the side surface thereof by rolling, punching, stamping, pressing, or bending, whereby integral tooth-supports are formed at requisite distances apart longitudinally with said bar or rail, allowing the teeth a horizontal movement in adjusting themselves to stand in a vertical position when the harrow is drawn in one direction and an inclined position when the motion of the harrow is reversed to the opposite direction, substantially as described.

3. In a harrow, the metal tooth-rail A, constructed substantially in the manner specified, having integral tooth-supporting stops C formed on the side thereof projecting horizontally from the edges of said rail, adapted to support and limit the angle at which the tooth shall stand, substantially as shown and described.

4. A metal harrow-tooth rail having depressions in the side surface of one or both of its edge portions, forming laterally-projecting loop or loops having integral shoulders or stops adapted to receive and support the harrow-teeth, which are secured in place between said loop or loops and the side of said rail, substantially as described.

5. The metal harrow-tooth rail A, having the integral tooth-supporting shoulders or stops C formed on the side thereof, in the manner specified, with the edge portion or portions, C′, of said rail projecting horizontally from the side thereof a sufficient distance to admit the tooth passing between said projecting portion or portions C′ and the side $C^2$ of said rail A, in combination with a harrow-tooth pivotally attached therein, substantially as shown and described.

6. The metal harrow-tooth rail A, having the integral tooth-supporting shoulders or stops C formed thereon, with the two edge portions, C′, of said rail projecting horizontally from one side thereof and the intervening central portion, $C^2$, of rail A projecting from the opposite side thereof, thereby forming an opening between said projections in a vertical direction through said rail, in which opening the harrow-tooth is inserted and supported therein, substantially as shown and described.

7. A metal harrow-tooth rail having depressed tooth-seats formed in the side surface of the central portion thereof, and corresponding depressions in the opposite side surface of the edge portions of said rail, forming side projecting loops or bridges which extend over or across the ends of said central depressions, said loops or bridges having each of their ends formed integral with said rail, whereby tooth-supporting shoulders or stops are formed, and a harrow-tooth pivotally attached between said loops and rail and supported at different angles, substantially as specified.

8. In a harrow, the combination of the rail A, produced from an ordinary wrought-metal bar of iron or steel, having the integral tooth-supporting shoulders or stops C formed thereon or within a central line with said rail by rolling, punching, stamping, pressing, or bending, whereby said shoulders or stops C are formed at requisite distances apart longitudinally with said rail to allow the teeth to automatically adjust themselves and to stand either in a vertical or an inclined position, and a pivotal bolt or pin adapted to hold said teeth in place, substantially as shown and described.

9. The within-described metal tooth-rail A, constructed substantially in the manner specified, having the integral tooth-supporting stops C, formed on the edges thereof, projecting horizontally from the side of said rail, adapted to support and limit the movement of the angular adjustable tooth, in combination with a pivotal bolt or pin which passes through perforations formed through both tooth and rail.

10. In combination with a harrow-tooth rail provided with stops for supporting a swinging tooth thereon at different angles, the pivotal bolt D, provided with the elevated or arch portion D′ and $D^2$, the tooth and rail having perforations through them in which the bolt D is passed, with the two arms $D^2$ $D^2$, which straddle over the tooth and extend down to the side of the rail, allowing the tooth a free pivotal movement thereon, substantially as shown and described.

11. In a harrow, the within-described pivotal bolt D, having the arch portion provided with arms projecting therefrom and straddling over the harrow-tooth and extending down to the rail on opposite sides of said tooth, in combination with a perforated tooth and a harrow-rail having perforations, and stops for supporting an angular adjustable tooth thereon, substantially as specified.

In testimony whereof I affix my signature in presence of two witnesses.

JAMES H. BARLEY.

Witnesses:

GEORGE FERRELL,

JAMES M. BYLER.